Nov. 21, 1950 — O. DOWNS — 2,530,382
HEATING WATER BY ELECTRICITY
Filed May 5, 1948 — 3 Sheets-Sheet 3

INVENTOR
Orville Downs
BY Victor J. Evans & Co.
ATTORNEYS

Patented Nov. 21, 1950

2,530,382

UNITED STATES PATENT OFFICE 2,530,382

HEATING WATER BY ELECTRICITY

Orville Downs, Clayton, N. J.

Application May 5, 1948, Serial No. 25,121

8 Claims. (Cl. 219—39)

This invention is a device for generating heat, or power, or both, without combustion and it differs from an internal combustion engine mainly in that (1) its power is exerted silently and gradually instead of with explosive impact, (2) its force is applied to the elevation of a movable fluid instead of to a movable piston, and (3) it requires no exhaust mechanism because there is no residue from combustion to be expelled.

This invention relates to a heating and cooling system as the preferred use for the aforementioned generating device, and the purpose of this invention is to provide a generating device particularly adapted to supply hot water or steam to radiators and the like of a heating system as well as to supply the power to pump the hot water or steam into forced circulation; and a device that may also be used to supply, and to force into circulation, a refrigerant to the system for the purpose of cooling wherein operation of the device is effected by expansion and contraction, and circulation of fluids therein.

More specifically this invention relates to a heating and cooling system of a type using expansion and contraction of air or other fluid as the operating means, said expansion and contraction being achieved by the alternate application of heat and cooling; and in particular this invention includes a tank within a tank with an electric heating element positioned in a confined air chamber in the inner tank and provided with control means for making and breaking a circuit to that heating element with changes of the elevation of the liquid in the inner tank or changes in the temperature or in the pressure of the air in the space above the liquid in the inner tank, and the invention also includes openings to permit the passage of fluid between the tanks as well as suitable inlet and outlet valves controlling the passage of fluid into and out of the tanks.

The invention, therefore, comprises a heating and cooling unit operating with a breathing action wherein fluids are forced out and into a system connected therewith by expansion of air and liquids therein and drawn into the unit by contraction of the air and liquid as the substances cool.

The object of the invention is to provide a combination of chambers, holding fluid such as air and water, with control valves associated therewith wherein heat in a confined area therein raises the temperature of a surrounding fluid and forces the fluid from the chambers by expansion of air in the confined area therein.

Another object of the invention is to provide control means for a heating and cooling unit operated by expansion and contraction of air, water, and other fluids that operates automatically to supply heat intermittently.

Another object of the invention is to provide a heating unit actuated by expansion and contraction of air or other fluids that may also be used for refrigeration.

A further object of the invention is to provide a heating and cooling unit operated by expansion and contraction of air or other fluids which is of a simple and economical construction.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended, wherein:

Figure 5 is a detail showing the float control valve with other parts omitted, illustrating a modification wherein a delayed action is provided in the valve control.

Figure 1:
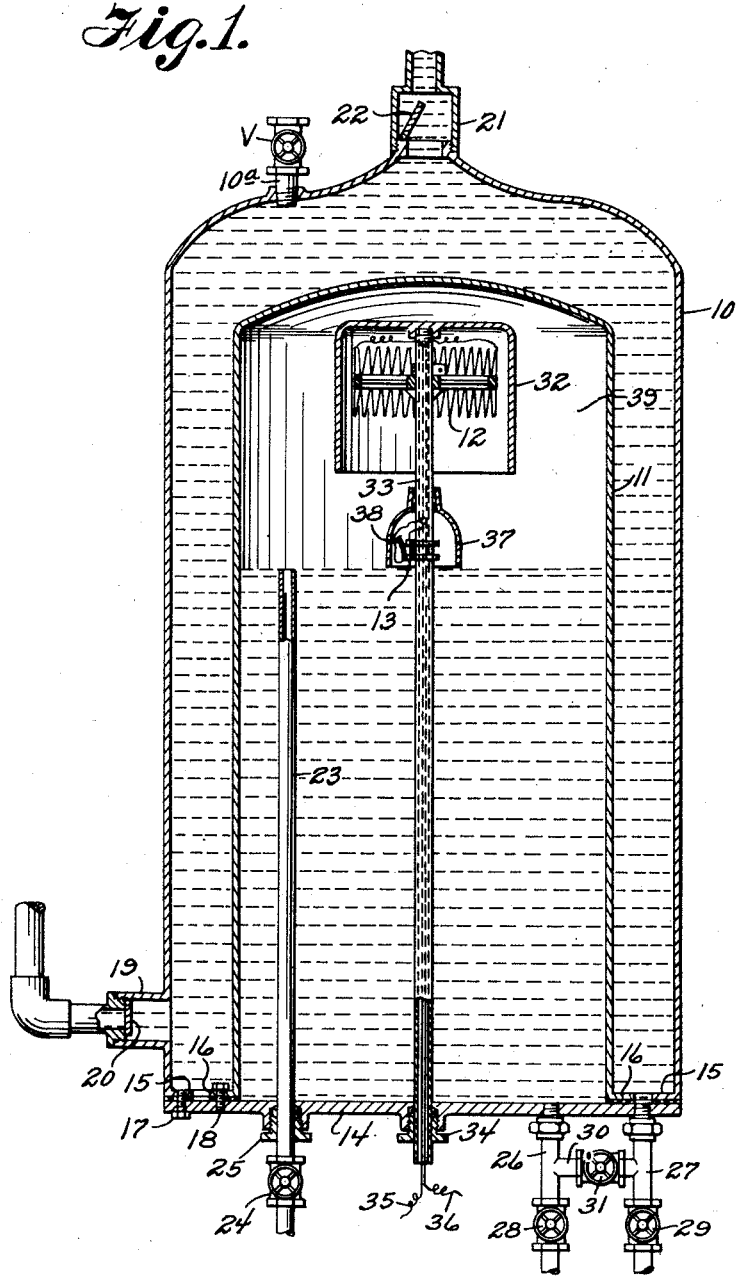
Figure 1 is a vertical section through a typical unit illustrating the relative positions of the parts and in which a thermostat is used to make and break the circuit to the heating element.

Referring now to the drawings wherein like reference characters indicate corresponding parts the heating and cooling unit of this invention includes an outer tank 10, an inner tank 11, an electric heating element 12, and a control switch 13.

In the design shown in Figure 1 the tanks 10 and 11 are mounted on a common base plate 14 through flanges 15 and 16 with bolts 17 and 18 and the outer tank 10 is provided with an inlet connection 19 having a check valve 20 therein and an outlet connection 21 also having a check valve 22 therein. The check valve 20 prevents fluid passing backward from the tank through the connection and the check valve 22 prevents liquid passing downward into the tank.

A tube 23 with a valve 24 on the outer end extends through a packing gland 25 in the base plate 14, and the inner end thereof extends upward to the air chamber in the upper part of the inner tank 11, so that air may be admitted or withdrawn, as desired, to adjust the volume of air in this chamber or to correct the liquid in the inner tank to a desired elevation. Pipe connections 26 and 27 with valves 28 and 29 therein may be provided in the base plate with the pipe 26 positioned in the inner tank 11, and the pipe 27 positioned in the outer tank 10. A cross connection 30 is provided between the pipes 26 and 27 and this is provided with a valve 31 so that the flow of fluid between the tanks may be controlled.

The electric heating element 12 is positioned in an inverted shell 32 at the upper end of a tubular post 33 that is supported through a packing gland 34 in the base plate 14, and current is supplied through the post to the element through wires 35 and 36, the wire 35 having the switch 13 therein. The switch 13 is also positioned in an inverted shell 37 on the post 33, and a thermostatic element 38 is provided on the switch to contact the terminals thereof and close the circuit when the temperature reaches a predetermined degree.

As current is supplied to the element 12 the element will heat and thereby expand the air in the chamber 39 and as the air expands the liquid in the inner tank will be forced out through the connection 30 and into the outer tank 10. The valve 20 preventing liquid passing through the connection 19, the liquid will be forced upwardly through the valve 22 and into the system through the connection 21. This action will continue until the heat from the heating element actuates the thermostat to break the circuit and with the circuit broken the elements will cool, and as the liquids contract by cooling the valve 22 will close and the valve 20 open so that liquid will be drawn into the outer tank through the supply connection 19. This completes the cycle and as the thermostat cools it will again complete the circuit and the cycle will be repeated.

Figure 2:
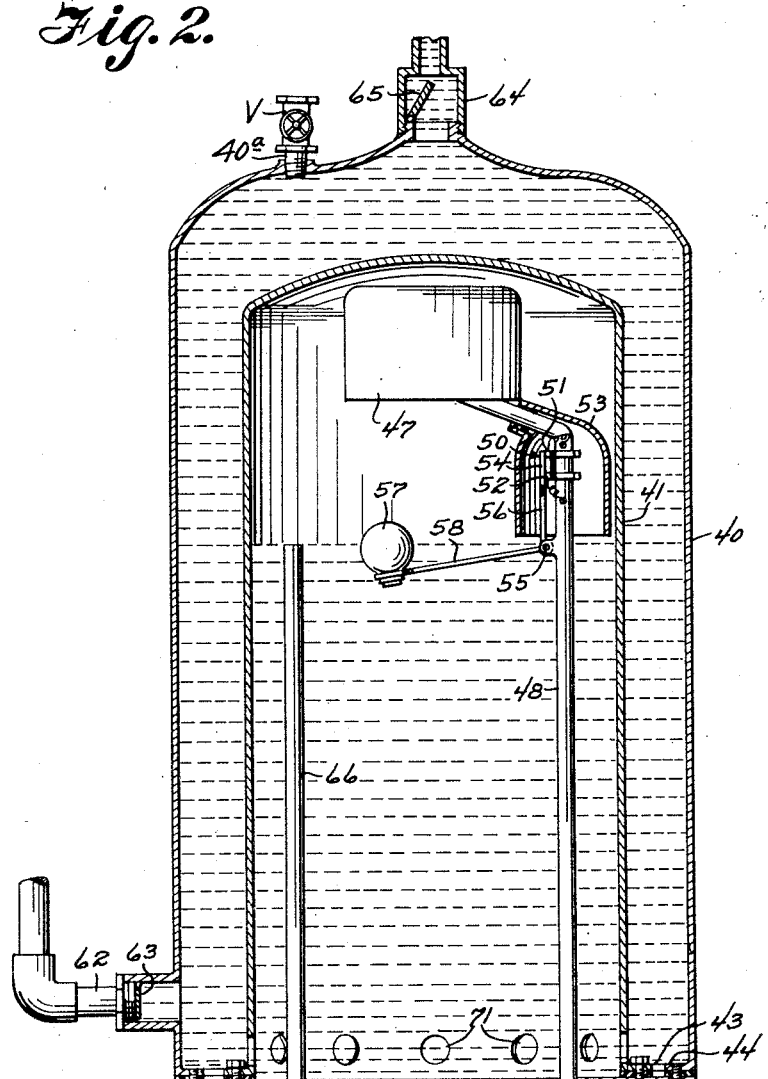
Figure 2 is a similar view showing a modification wherein a float controlled switch is used instead of the thermostat, and communicating openings are provided in the lower ends of the chambers.

In the design shown in Figure 2 the unit is provided with an outer tank 40 and an inner tank 41 with the tanks mounted on a common base plate 42 through flanges 43 and 44 and bolts 45 and 46, and an electric heating element is provided in a shell 47 at the upper end of a post 48 that is held in a packing gland 49 in the base plate 42. In this design a switch 50 having contact points 51 and 52 is mounted in a shell 53 and a contact bar 54 is pivotally mounted on the post at the point 55 through an arm 56 wherein as the arm is actuated by a float 57 on a lever 58 the bar will engage the contact points and close the circuit to the heating element. In the modification shown in Figure 5 the arms 56a and 58a are independently mounted and the arm 58a is provided with projections 59 and 60 that actuate the arm 56a. By this means the closing action of the switch is delayed until the float rises sufficiently for the projection 59 to engage the arm 56a, at which time the arm will move the bar 54a to engagement with the contact points. The bar 54a is insulated from the arm 56a by insulation 61, as shown.

The tank 40 is provided with an inlet connection 62 having a check valve 63 therein, and an outlet connection 64 having a check valve 65 therein. The inner tank 41 is provided with a tubular connection 66 having a valve 67 therein and the connection is mounted in the base plate through a packing gland 68. A drain connection 69 with a valve 70 therein is also provided in the base plate and positioned in the inner tank and the wall of the inner tank is provided with openings 71 which provide communicating means between the inner and outer tanks.

In this design and also in the unit shown in Figure 1 the shells over the heating elements and switches are sealed at the upper ends so that as the liquid rises the air will be confined in the shells causing air pockets or cushions that prevent water or other fluid passing upward to contact the switches or other heating elements.

Figure 3:
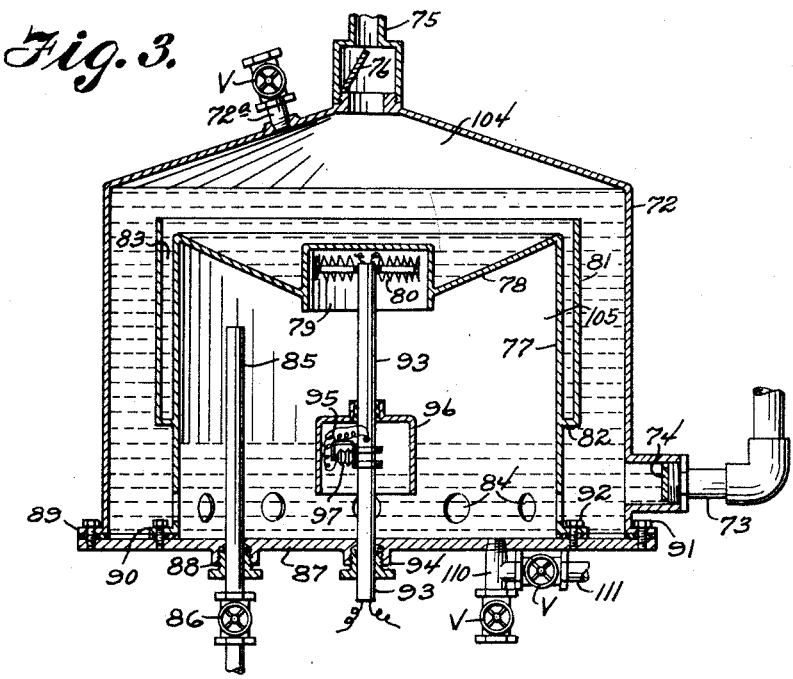
Figure 3 is a similar section showing a further modification wherein means are provided for holding comparatively small amounts of liquid around the heating element to facilitate heating, and in which the liquids are illustrated as being under pressure.

In the design shown in Figure 3 an outer tank 72 is provided with an inlet connection 73 having a check valve 74 therein and an outlet connection 75 having a check valve 76 therein. In this design an inner tank 77, similar to the tanks 11 and 41, is provided with a dished upper end 78 having an inverted pocket 79 for the heating element 80 therein, and it will be noted that a comparatively small amount of liquid will be retained in the upper end, as shown in the design illustrated in Figure 4, and this small amount of liquid will be readily heated. The upper part of the inner tank is also provided with a surrounding sleeve 81 joined to the tank at the lower end 82 thereof, thereby providing a relatively thin film of liquid 83 around the heated air pocket in the upper end of the tank 77. The lower end of the tank 77 is provided with openings 84 which provide communicating means between the inner and outer tanks, and this tank is also provided with a tubular connection 85 having a valve 86 at the lower end and mounted in a base plate 87 through a packing gland 88. The tanks 72 and 77 are also mounted on the base plate 87 through flanges 89 and 90 and bolts 91 and 92, and the heating element is supported on a post 93, which is mounted in the base plate through a packing gland 94.

In this design a switch 95 is provided in a shell 96 and the switch is actuated by a thermostat 97 which makes the circuit as the heat decreases and breaks the circuit after the temperature rises. The shell 96 and also the pocket 79 are sealed at the upper ends providing air cushions that protect the switch and heating element from the liquid in the tanks.

Figure 4:
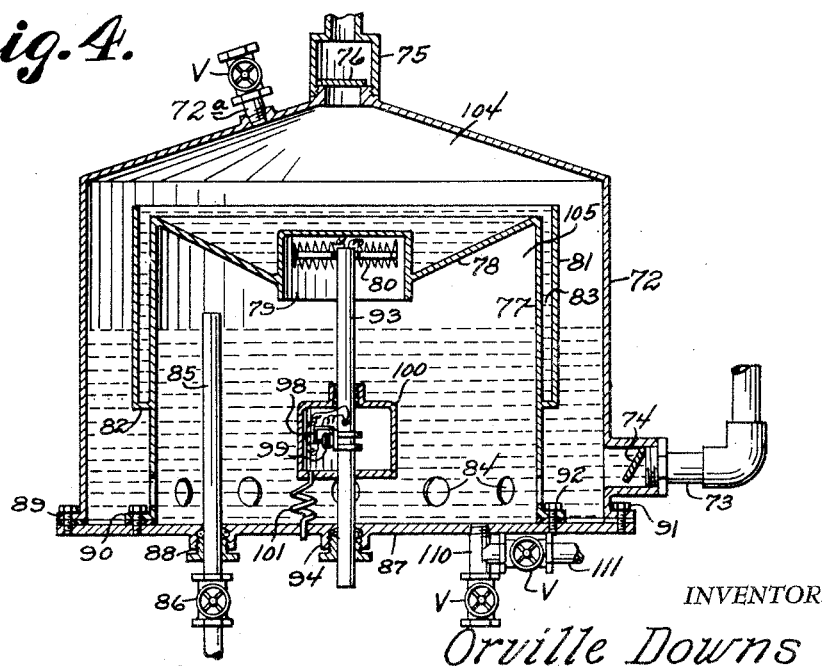
Figure 4 is a similar section showing the liquids in the starting position in which the pressures in the different chambers are substantially equalized, and showing a modification wherein the thermostat is enclosed and the enclosure provided with a breather tube.

In the design shown in Figure 4 a switch 98 and a thermostat 99 are enclosed in a casing 100, and the interior of the casing is connected to the outside by a breather coil 101. In this design the same reference numerals are applied to the tanks, and the other parts thereof as used in Figure 3 for the convenience of comparison.

When used for heating the comparatively small body of water around the heating element will be converted into steam which will fill the steam dome 104, and as air in the chamber 105 expands it will force the water from the inner tank into the outer tank and this will force the steam through the valve 76 and into the system through the connection 75. At the same time the level of the water in the outer tank will rise, as shown in Figure 3, and fill the area in the upper end of the tank and inside of the sleeve 81. Upon cooling, after the thermostat breaks the circuit the water or liquids will return to the level shown in Figure 4.

When the unit is used for refrigerating purposes the operation is substantially the same except that with a refrigerant used instead of, or mixed with, water (depending on what refrigerating system is used) the heat converts the liquid into gases or vapors which are then forced into circulation for cooling purposees. For instance, when the ammonia absorption system is used vapors are forced out of the outlet connection to a rectifier or drier where water is removed from the ammonia vapor and returned, being drawn directly through the inlet connection into the outer tank by the intermittent suction in the cooling step. At the same time the ammonia passes to the condenser where it loses its heat and is reduced to liquid ammonia, which being under pressure may be expanded through an expansion valve into the system for cooling. After use the ammonia is drawn back into the unit through the inlet connection with the water.

The structural elements of the unit are, therefore, substantially the same for both heating and cooling. The alternating cycles of expansion and contraction provide a pulsating action, which, particularly in heating, force steam or hot water through the system with considerable force eliminating the necessity of circulating pumps and the like.

In starting the operation the tanks are substantially filled with water, as shown in Figures 1 and 2, and in order to regulate the liquid level and the amount of air in the outer tank, the tanks are provided with valves in the upper ends. The tank 10 having a connection 10a with a valve V therein, the tank 40 having a connection 40a with a valve V therein, and the tank 72 shown in Figures 3 and 4, is provided with a connection 72a with a valve V therein. The tank 72 is also provided with a drain connection 110 with an inlet 111 in the side and valves V therein.

It will be understood that, although it has been described as a pump with pulsating action, this apparatus constitutes an engine for producing power by alternately expanding and contracting confined air which, in turn, alternately lowers and raises the elevation of a movable fluid, within a system of tanks, with enough force to do work, and the engine may be used as a pump, hydraulic ram, or other power unit, and may be used for any purpose, with slight modifications.

The inverted shells over the electric heating elements and switches protect the elements from water or other fluids in the tank as with the upper ends of the shells sealed confined air pockets are provided in the shells, and the water is prevented from passing upwardly into the shells by air trapped therein.

It will also be understood that other modifications may be made in the design or arrangement of the parts without departing from the spirit of the invention.

What is claimed is:

1. A heating and cooling unit comprising an outer tank having inlet and outlet connections, an inner tank positioned in the outer tank and spaced from the walls thereof, a heating element positioned in the upper part of the inner tank, a switch also positioned in the upper part of the inner tank connected in a circuit to the heating element, a tubular connection extending from the upper part of the inner tank to the exterior of the unit a valve in said tubular connection, a connection from the lower end of the inner tank to the lower end of the outer tank, and means actuating the switch to open and close a circuit to the heating element.

2. A heating and cooling unit comprising an outer tank having inlet and outlet connections, an inner tank positioned in the outer tank and spaced from the walls thereof, the upper end of said inner tank being sealed providing an air pocket therein, a heating element positioned in the air pocket of the inner tank, a switch also positioned in the air pocket of the inner tank connected in a circuit to the heating element, inverted shells closed at the upper ends and with the lower ends thereof open covering the heating element and switch, a tubular connection extending from the pocket in the inner tank to the exterior of the unit a valve in said tubular connection, communicating means between the lower ends of the tanks, and means actuating the switch to open and close a circuit to the heating element.

3. A heating and cooling unit comprising an outer tank having inlet and outlet connections, an inner tank positioned in the outer tank and spaced from the side and upper walls thereof, a heating element positioned in the upper part of the inner tank, a switch also positioned in the upper part of the inner tank connected in a circuit to the heating element, shells covering the heating element and switch, a connection extending from the upper part of the inner tank to the exterior of the unit, regulating means in said connection, and means automatically actuating the switch to open and close a circuit to the heating element, said unit having communication means between the inner and outer tanks at the lower ends thereof.

4. A heating and cooling unit comprising an outer tank having inlet and outlet connections, an inner tank positioned in the outer tank and spaced from the walls thereof, a heating element positioned in the upper part of the inner tank, a switch associated with the heating element also positioned in the upper part of the inner tank, a float connected to the switch for actuating the switch with a delayed action, jackets sealed at the upper ends positioned over the heating element and switch, communicating means between the lower ends of the tanks, and means controlling the amount of trapped air in the upper end of the inner tank.

5. In an air conditioning unit, the combination, which comprises, an inner tank with openings through the wall spaced from the lower end thereof, an outer tank surrounding the inner tank and spaced from the outer surface thereof, an outlet connection having a valve therein in the upper end of the outer tank, an inlet connection having a valve therein in the lower part of the outer tank, a tubular connection having a valve therein extending into a confined area in the upper end of the inner tank, a heating element positioned in the confined area in the upper end of the inner tank, an inverted closure with a sealed upper end covering the said heating element, a control switch in the inner tank in the circuit to the heating element, an inverted closure with a sealed upper end covering the said switch, and means actuating the switch to break the circuit to the heating element when the temperature reaches a predetermined degree.

6. In an air conditioning unit, the combination, which comprises, an inner tank having an indented upper end providing a shallow reservoir in the said upper end and having a sleeve connected to the tank at the lower end surrounding the upper portion of the tank and spaced therefrom, an outer tank surrounding the inner tank and spaced from the sides and upper end thereof, an inlet connection in the lower end of the outer tank, an outlet connection in the upper end of the outer tank, a control connection extending into the upper end of the inner tank, valves in said connections, the indented upper end of the inner tank having an inverted pocket therein, a heating element in said pocket, a switch in the inner tank connected in a circuit to the heating element, a cover enclosing said switch, a breather connection from said cover to the exterior of the unit, means actuating the said switch by fluid or as a result of heat in the inner tank to open and close the circuit to the heating element, said inner tank having communicating means between the lower part thereof and the lower part of the outer tank wherein expansion of air in the upper end thereof forces expanding fluid from the inner tank to the outer tank and from the outer tank through the outlet connection thereof, and contraction of air in the upper end of the inner tank, combined with contraction of fluid in both tanks, draws fluid through the inlet connection of the outer tank into the tanks.

7. In combination, two tanks, one smaller than and inverted within the other, with means for passage of liquid between the inside and outside tanks only near the bottom where they are fastened to a common base, inlet and outlet valves in the outside tank, means to regulate the amount of liquid in each tank, means to regulate the amount of air in the inside tank, means to regulate the amount of air in the outside tank, means by which fluid may be added to or drained from the system from the same pipe, a heating element in the air space above the liquid in the inside tank, means to control the heat supplied by the heating element according to the liquid level, means to control a heat supplied by the heating elements according to the heat, and means to control the heat supplied to the heating element according to the air pressure within the inside tank, whereby air above the liquid in the inside tank, by the alternate and controlled application of heat and cooling thereto, is forced to alternately expand and contract and in turn, through the liquid passage means in the lower part of the inside tank, force liquid up and down in the outside tank, or in and out of the outside tank, with sufficient force to do work.

8. A heating and cooling unit as described in claim 1, having a connection with a valve therein in the upper part of the outer tank providing communicating means between the inside of the tank and the atmosphere for regulating the amount of air in the outside tank.

ORVILLE DOWNS.

REFERENCES CITED

The following references are of record in the file of this patent:

UNITED STATES PATENTS

| Number | Name | Date |
| --- | --- | --- |
| 1,630,943 | Hutton | May 31, 1927 |
| 1,844,268 | Alex | Feb. 9, 1932 |
| 2,170,225 | Unge | Aug. 22, 1939 |
| 2,278,991 | Hasslacher et al. | Apr. 7, 1942 |